Aug. 26, 1958 R. F. CASEY 2,849,609

SWEEP CIRCUIT HAVING AN ADJUSTABLE EXPANDED SECTION

Filed Aug. 19, 1954

INVENTOR.
ROBERT F. CASEY

BY Darby & Darby

ATTORNEYS 2,849,609
Patented Aug. 26, 1958

2,849,609

SWEEP CIRCUIT HAVING AN ADJUSTABLE EXPANDED SECTION

Robert F. Casey, Pompton Plains, N. J., assignor to Allen B. Du Mont Laboratories, Inc., Clifton, N. J., a corporation of Delaware Application August 19, 1954, Serial No. 451,027

7 Claims. (Cl. 250—27)

This invention relates to improvements in sweep voltage generating circuits, and more specifically to a method of expanding a selected portion of a waveform for study. Heretofore, this result has been achieved by the cumbersome method of switching back and forth from the entire waveform to the expanded desired section to be studied. Sometimes, due to the development of transients, it is difficult to determine exactly which portion of a waveform has been expanded for study. In other words, it is difficult to be certain under these conditions that the desired portion of a waveform has been expanded.

A broad object of this invention is to provide a circuit by means of which it is possible to expand a desired portion of a waveform for study.

In accordance with this invention one object is to provide a circuit which expands a selected portion of a waveform for study with certainty so that there can be no doubt that the expanded portion is the one selected and desired for study.

A subsidiary object of the invention is to accomplish these purposes without introducing switching transients.

A still further object of the invention is to provide a circuit which makes it possible to progressively select study portions of a waveform.

Another object of the invention is to provide a circuit which operates initially at one sweep-speed, changes to another sweep-speed, and then returns to its original sweep-speed automatically.

Broadly speaking, this invention involves a sweep-generator whose operation is modified by electrically changing the value of a sweep-capacitor so that an accelerated sweep is produced for a selected interval without disturbing the remaining portions of the sweep.

In view of this approach it is another object of this invention to provide a novel method of changing the effective capacitance of a capacitor.

A more specific object of the invention is to change the effective capacity of a capacitance by applying a voltage to one terminal and a variable voltage to the other terminal, that is the terminal which is normally grounded in a sweep-generator.

Other and more detailed objects of this invention will be apparent from the following description of the embodiments thereof illustrated in the attached drawings.

It will be helpful in analyzing the following disclosure to have the following terms defined:

"Upvolting" means raising the potential but not necessarily to a positive value;

"Downvolting" means lowering the potential but not necessarily to a negative value.

The basic concept of changing the effective capacity of a capacitor by electrical methods can be most satisfactorily expressed mathematically, but also a quasi-physical explanation is possible, both of which are presented below.

Assume that a capacitor, one plate of which is grounded, is being charged with a current I, and after a time T develops a voltage V relative to ground. The capacity is then given by the equation:

$$C=\frac{IT}{V}$$

Assuming now that the formerly grounded plate is being upvolted by some means until it is at V′ volts above ground, while the charging action previously described is taking place at the same time, at the time T the apparent capacitance of the capacitor is now given by the equation:

$$C=\frac{IT}{V+V'}$$

Under these conditions C is obviously smaller than the actual physical capacitance of the capacitor. Conversely the formerly grounded plate could be downvolted until it were minus V volts (below ground). Obviously, under these conditions the apparent capacitance would be larger than the actual physical capacitance. Thus it may be seen the effective value may be changed by simultaneously applying varying potentials to the terminals of a capacitor.

Figure 1:
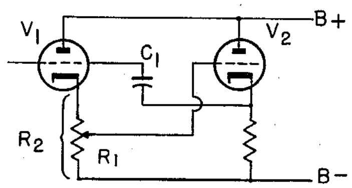
Figure 1 is a schematic circuit arrangement illustrating one method of changing the effective capacity of a capacitor which may be a sweep-capacitor.

The arrangement for accomplishing the first of these conditions is diagrammatically illustrated in Figure 1, in which a pair of electron tubes $V_1$ and $V_2$ are shown connected as cathode followers. In the cathode lead of $V_1$ is a resistor $R_2$ having a movable contact connected to the grid of tube $V_2$, for selecting a portion $R_1$. The capacitor $C_1$ is connected between the input grid of tube $V_1$ and the cathode of tube $V_2$. The conditions with regard to $C_1$ can be expressed mathematically as follows:

$$C_0=C_1-C_1\left(\frac{R_1}{R_2}\times(A_1A_2)\right)$$

where $C_0$ is the effective capacitance, $C_1$ is the physical capacitance, $A_1$ is the voltage gain of $V_1$, and $A_2$ is the voltage gain of $V_2$.

It is apparent that if $A_1$ or $A_2$= zero (tube cutoff or a further gain prevented) $C_0=C_1$ regardless of the value of $R_1$ or $R_2$.

Similarly, if $R_1$ approaches $R_2$, and if ($A_1$ $A_2$) approaches unity, then $C_0$ approaches zero. Since tubes $V_1$ and $V_2$ are both cathode followers with a maximum amplification of less than 1, when both tubes conduct the product $A_1$ $A_2$ approaches unity. Further, in actual practice $R_1$ usually equals $R_2$ so that the condition of $C_0$ equalling zero is approximated. The above comprises a mathematical statement of the physical explanation given above.

Figure 2:
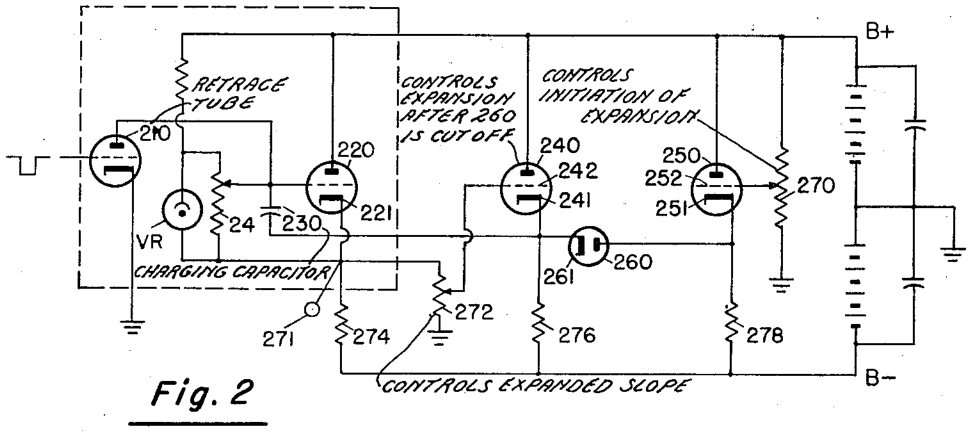
Figure 2 is a schematic circuit drawing of a circuit generator employing the arrangement of Figure 1.

This arrangement is shown at work in Figure 2 in a sweep circuit which attains the objects herein disclosed. Within the broken line box is a linearized sawtooth waveform generator circuit. It will be understood by those skilled in the art that the subject matter of this invention may be applied to circuits producing other and more complex waveforms. The electron-tube 210 is a switch-tube as it switches the generator between the sweep and retrace portions of a cycle. Electron-tube 220 is a sweep-tube because the desired sweep-voltage is developed at its cathode resistor 274. Capacitor 230 is a sweep capacitor, as it determines the sweep speed, which is not directly grounded as in the usual case.

As indicated in Figure 2, a suitable pulsing signal is applied to the grid of the electron-tube 210, the cathode of which is grounded. The anode of this tube is connected to the grid of electron-tube 220, whose anode is connected to the positive terminal B+ of a suitable voltage source, and its cathode is connected to the sweep output-terminal 271. The positive terminal of the potential source is connected to the anode of tube 220 and is connected through a resistor and a voltage regulating device VR to the cathode 221. The voltage regulating device is shunted by a potentiometer 24 having a movable contact which is connected to one side of the sweep capacitor 230 and to the grid of tube 220. The other side of sweep capacitor 230 is connected to the cathode of electron-tube 240.

Electron-tube 240 comprises an expander-tube whose anode is connected to B+ and whose cathode 241 is connected to B— through resistor 276. The grid 242 of electron-tube 240 is connected to the movable contact of a grounded potentiometer 272 which is connected to the output terminal 271.

At 250 is an electron-tube which is called the delay tube, which has its anode connected to B+ and its cathode 251 connected to B— through the resistor 278. Its grid 252 is connected to the movable contact of a potentiometer 270 in connection from B+ to ground. As shown, cathodes 241 and 251 are interconnected by a vacuum tube rectifier 260, its cathode 261 being directly connected to cathode 241 and its anode to cathode 251. Equivalent unidirectional conducting devices could be used. It will be noted that sweep-tube 220, expander-tube 240, and delay-tube 250 are all connected as cathode followers, whose action is such that each cathode follows its respective grid during upvolting and downvolting.

Potentiometer 270 may be termed a delay-control potentiometer, and the connections are such that expander-tube 250 is always conductive.

As is well understood, the output of the sweep circuit appears at cathode 221 so that terminal 271 becomes the output terminal of the generator. Potentiometer 272, which may be called an expander-potentiometer, is between the output terminal 271 and ground, with its movable contact continually feeding a portion of the sweep-voltage to grid 242 of the expander-tube 240.

In the operation of this circuit, when tube 210 is cut off by the leading edge of the input signal a characteristic sweep waveform is developed between the sweep-capacitor 230 and ground; its A. C. ground connection being through the conductive unilateral diode 260, the conductive delay-tube 250, and the usual by-passed B+ supply, this path being in parallel with the various cathode resistors. This circuit has effectively a very low A. C. impedance and for the purposes of this circuit the sweep-capacitor 230 is grounded.

Since delay-tube 250 is connected as a cathode follower the potential fixed by the delay-control potentiometer 270 for grid 252 causes the cathode 251 to assume a slightly higher value, which is applied to cathode 241 through the conductive unilateral device 260. The diode tube 260 is conductive at this time because its cathode 261 is connected to B— and its anode is connected to the cathode 251, which is always above ground potential. Expander-tube 240 is therefore non-conductive until such time as the expander potentiometer 272 upvolts grid 242 to such potential that conductivity is permitted in view of the potential on cathode 241.

To summarize at this point the sweep-circuit generator generates a waveform across sweep-capacitor 230, delay-tube 250 and unilateral device 260 are conductive but their only effect so far has been to determine the potential of cathode 241 of expander-tube 240 which is not conductive.

However, as the sweep-voltage applied across the expander-potentiometer 272 increased, grid 242 is upvolted until expander-tube 240 does conduct. Since the grid 242 is being upvolted at sweep speed, as modified by the expander-potentiometer 272, so is the cathode 241 of cathode follower expander-tube 240, and this upvolting is simultaneously applied to the bottom terminal of sweep-capacitor 230, and of course, to the cathode 261 of rectifier 260. Since the lower plate of capacitor 230 is being upvolted, its instantaneous capacitance is therefore being decreased electrically, as previously explained. The resultant sweep-voltage therefore rises very rapidly since the reduced capacitance of 230 is charged up much more quickly.

However, the upvolting of cathode 261 soon cuts off rectifier 260, substituting the now-conductive expander-tube 240 for the delay-tube 250 as the grounding circuit for sweep-capacitor 230.

Thus in this circuit the accelerated sweep speed persists until switch-tube 210 is rendered conductive by the trailing edge of the input signal, whereupon retrace is initiated and the original state obtained (permitting the start of a new saw).

With this arrangement the usual sweep speed for an interval determined by the setting of potentiometer 270 is obtained, whereupon an accelerated sweep-speed is obtained, the acceleration being determined by circuit constants and the setting of potentiometer 272. As suggested the retrace is controlled by the input signal applied to the grid of switch-tube 210.

Figure 3:
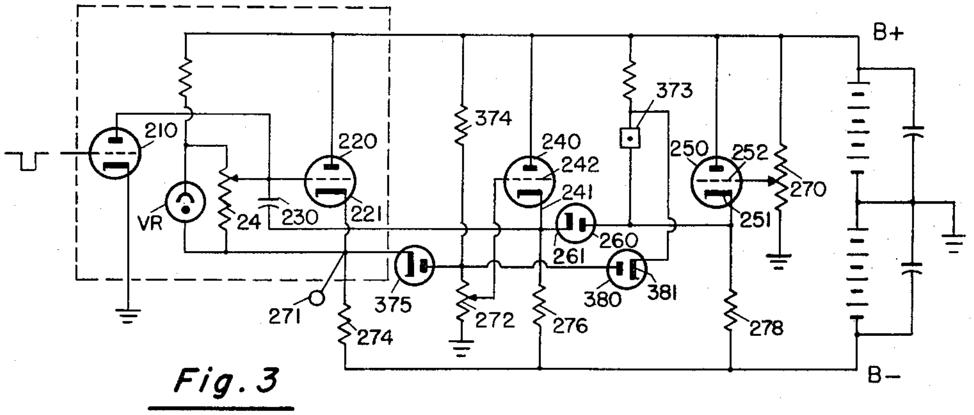
Figure 3 is a schematic circuit drawing of a modified form of the invention of Figure 2.
Figure 4:
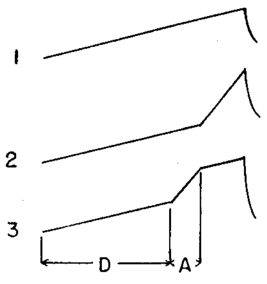
Figure 4 is a curve of the related waveforms which are of importance in this invention.

This action is illustrated in curves 1 and 2 of Figure 4, wherein curve 1 represents a waveform at normal sweep-speed and curve 2 represents an increase for a portion of the waveform from normal sweep-speed to accelerated sweep-speed. As stated hereinbefore, at times it may be desirable to limit the period of the accelerated sweep-speed to a portion of the cycle and then to return to the original sweep-speed for the remainder thereof. There is illustrated in Figure 3 an arrangement for accomplishing such operation. A considerable portion of the circuit of Figure 3 is the same as that in Figure 1, and so the same reference numerals have been applied. Additional elements have been included as follows: Connected in series between the anode of the diode 260 and B+ are a resistor and a voltage regulator 373. Connected between the common terminal of this resistor and voltage regulator 373 is a diode 380, the connection being made to its cathode and its anode being connected to the top of potentiometer 272. This point is also connected to B+ through a resistor 374 and to the anode of diode 375 whose cathode is connected to the output terminal 271.

In the operation of this circuit it will be seen that the voltage regulating device 373 maintains cathode 381 of the rectifier 380 at a fixed potential above the cathode 251 whose potential, as previously explained, is determined by the delay-control potentiometer 270. Thus the diode 380 acts as a clamping rectifier. Thus the accelerated sweep-speed of the circuit, as previously described in connection with Figure 2, is maintained until grid 242 has risen to the voltage predetermined by the voltage regulator 373. At this point the unilateral device 380 becomes conductive and clamps grid 242, preventing any further upvolting. Since cathode follower action clamps cathode 241 and therefore the bottom terminal of sweep-capacitor 230, upvolting thereof is terminated and sweep-capacitor 230 is returned to its original physical capacity, thereby restoring the original sweep-speed. Resistor 374 and rectifier 375, which acts as a de-coupling device, replace the original connection between grid 242, potentiometer 272 and output terminal 271 to permit the original sweep-speed to be reattained, despite the clamping of grid 242.

Were it not for this decoupling device the voltage of output-terminal 271 would also be fixed or clamped, and no further sweep-voltage would appear. However, with this additional connection any higher sweep-voltage appearing at output terminal 271 causes decoupling at the diode 375 and the sweep-voltage may rise, as determined by circuit constants and the input signal.

The expander-potentiometer 272 may be eliminated if desired. If its movable contact is moved to the top of the resistor which corresponds to $R_1$ equalling $R_2$, see Fig. 1, the potentiometer is effectively removed from the circuit. Its removal now substitutes an open circuit of infinite resistance for the finite value previously used.

Curve 3 of Fig. 4 shows the resultant voltage wave produced by the operation of returning the original sweep speed is accomplished by the circuit of Figure 3. The delay period D is continuously adjustable. The period of accelerated sweep-speed is shown at A and is determined by the value of the voltage regulator 373. Thus, any portion of the sweep may be expanded and studied without disturbing its relation with the remainder of the waveform. By selecting the proper voltage regulator 373 the period "A" may be controlled as desired.

In view of the above description it will be apparent to those skilled in the art that the details of this invention are capable of variation without departing from the novel subject matter herein disclosed. I prefer, therefore, to be limited only as required by the claims and not by the disclosure.

What is claimed is:

1. A circuit for generating a sawtooth voltage waveform having at least two different slopes, said circuit comprising a capacitor; a charging circuit connected to one terminal of said capacitor to supply thereto a charging current to develop across said capacitor a voltage which increases according to a first of said slopes; a cathode follower having an input connected to said capacitor to be energized by the voltage thereacross; a second cathode follower having an input connected to the output of said first cathode follower to be energized by the voltage therefrom; a load resistor connected to the cathode of said second cathode follower; a connection from the remaining terminal of said capacitor to the junction of said load resistor and said cathode; a direct current bias voltage source connected to said second cathode follower to render it non-conductive until said capacitor has charged to a predetermined level, said second cathode follower then becoming conductive and transferring to said cathode a reduced amplitude replica of the voltage with which said second cathode follower is energized, thereby upvolting said capacitor according to a second slope which is greater than said first slope; a diode having an anode connected to said source of voltage and a cathode connected to said cathode of said second cathode follower; an amplifier having a control grid and a cathode; a connection from said control grid to said direct current source; a load resistor connected to said last named cathode; and a connection from the anode of said diode to said last named cathode.

2. The circuit of claim 1 in which said connection from said control grid to said direct current source comprises a potentiometer connected to said direct current source and a connection by the arm of said potentiometer and said control grid whereby the bias of said amplifier tube may be varied to adjust the voltage level at which said second cathode-follower becomes conductive, thereby adjusting the time relative to the start of each sawtooth wave when the second slope commences.

3. The circuit of claim 2 comprising additionally constant voltage means having a positive and negative terminal; connection between said negative terminal and the cathode of said amplifier; a limiting diode having a cathode connected to the positive terminal of said means and an anode connected to the connection between the output of said first cathode-follower and the input of said second cathode-follower whereby when the voltage at the anode of said last-named diode becomes more positive than the positive terminal of said means said second cathode-follower is rendered inoperative and a coupling diode comprising said last-named connection, said coupling diode having a cathode connected to the output of said first cathode-follower and an anode connected to said anode of said limiting diode to allow the output of said second cathode-follower to resume increasing at the rate of said first slope after said second cathode-follower becomes inoperative.

4. A circuit for producing a sweep voltage waveform having a portion of increased slope, comprising: a sweep circuit having a capacitance whereby an output potential increasing at a given rate is produced; means causing said output potential to increase at a sharply different rate, said means comprising means, energized at a selectable level of said output signal, for applying a replica of said output signal to said capacitance; and means causing the rate of increase of said output potential to return to said original rate, said means comprising means to disable said replica applying means.

5. A circuit for producing a sweep voltage waveform having a portion of increased slope, comprising: a sweep generating circuit having a capacitance and charging means therefor whereby an output sweep potential increasing at a given slope is produced; means adding a replica of said sweep voltage to said original sweep voltage thereby causing said sweep voltage waveform to sharply increase its slope, said means comprising a normally non-conductive amplifier having an input electrode connected to one terminal of said capacitor and an output electrode connected to the other terminal of said capacitor; aand means causing said amplifier to become conductive at a given level of said sweep voltage, said means comprising a clamp tube and a source of adjustable bias whereby when said given level of sweep overcomes said bias, said amplifier becomes conductive and suddenly adds its output to said sweep voltage.

6. The device of claim 5 including means causing said waveform to resume its original slope, said means comprising clamping means causing said amplifier to become non-conductive whereby said waveform starts at one slope, abruptly increases its slope, and then abruptly reverts back to its original slope.

7. A circuit for generating a sawtooth voltage having at least two different slopes, said circuit comprising a capacitor; a charging circuit connected to one terminal of said capacitor to supply thereto a charging current to develop across said capacitor a voltage which increases according to a first of said slopes; a cathode follower having an input connected to said capacitor to be energized by the voltage thereacross; a second cathode follower having an input connected to the output of said first cathode follower to be energized by the voltage therefrom; a load resistor connected to the cathode of said second cathode follower; a connection from the remaining terminal of said capacitor to the junction of said load resistor and said cathode; a bias voltage source connected to said second cathode follower to render it non-conductive until said capacitor has charged to a predetermined level, said second cathode follower then becoming conductive and transferring to said cathode a reduced amplitude replica of the voltage with which said second cathode follower is energized, thereby upvolting said capacitor according to a second slope which is greater than said first slope; and means to disable said replica transferring means whereby the original slope may be reestablished.

References Cited in the file of this patent

UNITED STATES PATENTS

| | | |
|---|---|---|
| 2,254,344 | Andrieu | Sept. 2, 1941 |
| 2,428,926 | Bliss | Oct. 14, 1947 |
| 2,441,246 | Miller et al. | May 11, 1948 |
| 2,461,871 | Bass | Feb. 15, 1949 |
| 2,540,539 | Moore | Feb. 6, 1951 |
| 2,557,770 | Scoles | June 19, 1951 |
| 2,656,462 | Slack | Oct. 20, 1953 |
| 2,683,806 | Moody | July 13, 1954 |
| 2,701,306 | Bess | Feb. 1, 1955 |
| 2,735,007 | McCurdy | Feb. 14, 1956 |